(12) United States Patent
Wang et al.

(10) Patent No.: US 11,824,804 B2
(45) Date of Patent: Nov. 21, 2023

(54) REFERENCE SIGNAL FOR ACTIVATING COMMUNICATION MODE

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/447,863

(22) Filed: Sep. 16, 2021

(65) Prior Publication Data

US 2023/0081914 A1 Mar. 16, 2023

(51) Int. Cl.
*H04W 24/10* (2009.01)
*H04L 5/00* (2006.01)
*H04W 72/542* (2023.01)
*H04W 88/06* (2009.01)
*H04W 56/00* (2009.01)

(52) U.S. Cl.
CPC ........... *H04L 5/0048* (2013.01); *H04W 24/10* (2013.01); *H04W 72/542* (2023.01); *H04W 88/06* (2013.01); *H04W 56/001* (2013.01)

(58) Field of Classification Search
CPC .. H04L 5/0048; H04W 72/542; H04W 24/10; H04W 88/06; H04W 56/001

USPC ........................................................ 370/252
See application file for complete search history.

(56) References Cited

U.S. PATENT DOCUMENTS

| | | | |
|---|---|---|---|
| 2013/0201914 A1 | 8/2013 | Wang et al. | |
| 2014/0036809 A1* | 2/2014 | Xu | H04W 52/325 370/329 |
| 2016/0374139 A1 | 12/2016 | Chen et al. | |
| 2019/0116608 A1* | 4/2019 | Kim | H04W 72/04 |
| 2019/0297603 A1 | 9/2019 | Guo et al. | |
| 2021/0153063 A1 | 5/2021 | Zhang et al. | |
| 2022/0070879 A1* | 3/2022 | Ryu | H04W 72/20 |

FOREIGN PATENT DOCUMENTS

WO 2020144602 A1 7/2020

OTHER PUBLICATIONS

Partial International Search Report—PCT/US2022/075262—ISA/EPO—dated Nov. 17, 2022.

(Continued)

*Primary Examiner* — Christopher R Crompton
(74) *Attorney, Agent, or Firm* — Harrity & Harrity, LLP

(57) ABSTRACT

Various aspects of the present disclosure generally relate to wireless communication. In some aspects, a first device may receive, from a second device, a sounding reference signal (SRS) prior to a scheduled communication. The first device may transmit, to the second device, an indication that a measurement of the SRS does not satisfy a threshold, if the measurement of the SRS does not satisfy the threshold. The first device may activate, based at least in part on the transmitting the indication and before the scheduled communication, a multi-point communication mode. Numerous other aspects are described.

30 Claims, 11 Drawing Sheets

(56) References Cited

OTHER PUBLICATIONS

International Search Report and Written Opinion—PCT/US2022/075262—ISA/EPO—dated Feb. 3, 2023.
Motorola: "On Remaining Details of Dynamic Aperiodic SRS Triggering", 3GPP TSG RAN WG1 Meeting #63, R1-106291, 3rd Generation Partnership Project, Mobile Competence Centre, 650, Route Des Lucioles, F-06921 Sophia-antipolis Cedex, France, vol. RAN WG1, No. Jacksonville, USA, Nov. 15, 2010-Nov. 19, 2010, Nov. 10, 2010, pp. 1-5, XP050468230, Section 2.1 , Alternate 2, Page 1.

* cited by examiner

REFERENCE SIGNAL FOR ACTIVATING COMMUNICATION MODE

FIELD OF THE DISCLOSURE

Aspects of the present disclosure generally relate to wireless communication and to techniques and apparatuses for using reference signals for activating a communication mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first device. The method may include receiving, from a second device, a sounding reference signal (SRS) prior to a scheduled communication. The method may include transmitting, to the second device, an indication that a measurement of the SRS does not satisfy a threshold if the measurement of the SRS does not satisfy the threshold. The method may include activating, based at least in part on the transmitting the indication and before the scheduled communication, a multi-point communication mode.

Some aspects described herein relate to a method of wireless communication performed by a second device. The method may include transmitting, to a first device, an SRS prior to a scheduled communication. The method may include receiving, from the first device, an indication that a measurement of the SRS does not satisfy a threshold. The method may include activating, based at least in part on the indication and before the scheduled communication, a multi-point communication mode.

Some aspects described herein relate to a first device for wireless communication. The first device may include memory, one or more processors coupled to the memory, and instructions stored in the memory and executable by the one or more processors. The instructions may be executable by the one or more processors to cause the first device to receive, from a second device, an SRS prior to a scheduled communication. The instructions may be executable by the one or more processors to cause the first device to transmit, to the second device, an indication that a measurement of the SRS does not satisfy a threshold if the measurement of the SRS does not satisfy the threshold. The instructions may be executable by the one or more processors to cause the first device to activate, based at least in part on the transmitting the indication and before the scheduled communication, a multi-point communication mode.

Some aspects described herein relate to a second device for wireless communication. The second device may include memory, one or more processors coupled to the memory, and instructions stored in the memory and executable by the one or more processors. The instructions may be executable by the one or more processors to cause the second device to transmit, to a first device, an SRS prior to a scheduled communication. The instructions may be executable by the one or more processors to cause the second device to receive, from the first device, an indication that a measurement of the SRS does not satisfy a threshold. The instructions may be executable by the one or more processors to cause the second device to activate, based at least in part on the indication and before the scheduled communication, a multi-point communication mode.

Some aspects described herein relate to a non-transitory computer-readable medium that stores one or more instructions for wireless communication by a first device. The one or more instructions, when executed by one or more processors of the first device, may cause the first device to receive, from a second device, an SRS prior to a scheduled communication. The one or more instructions, when executed by one or more processors of the first device, may cause the first device to transmit, to the second device, an indication that a measurement of the SRS does not satisfy a threshold if the measurement of the SRS does not satisfy the threshold. The one or more instructions, when executed by one or more processors of the first device, may cause the first device to activate, based at least in part on the transmitting the indication and before the scheduled communication, a multi-point communication mode.

Some aspects described herein relate to a non-transitory computer-readable medium that stores one or more instructions for wireless communication by a second device. The one or more instructions, when executed by one or more processors of the second device, may cause the second device to transmit, to a first device, an SRS prior to a scheduled communication. The one or more instructions, when executed by one or more processors of the second device, may cause the second device to receive, from the first device, an indication that a measurement of the SRS does not satisfy a threshold. The one or more instructions, when executed by one or more processors of the second device, may cause the second device to activate, based at least in part on the indication and before the scheduled communication, a multi-point communication mode.

Some aspects described herein relate to an apparatus for wireless communication. The apparatus may include means for receiving, from another apparatus, an SRS prior to a scheduled communication. The apparatus may include means for transmitting, to the other apparatus, an indication that a measurement of the SRS does not satisfy a threshold if the measurement of the SRS does not satisfy the threshold. The apparatus may include means for activating, based at least in part on the transmitting the indication and before the scheduled communication, a multi-point communication mode.

Some aspects described herein relate to an apparatus for wireless communication. The apparatus may include means for transmitting, to another apparatus, an SRS prior to a scheduled communication. The apparatus may include means for receiving, from the other apparatus, an indication that a measurement of the SRS does not satisfy a threshold. The apparatus may include means for activating, based at least in part on the indication and before the scheduled communication, a multi-point communication mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
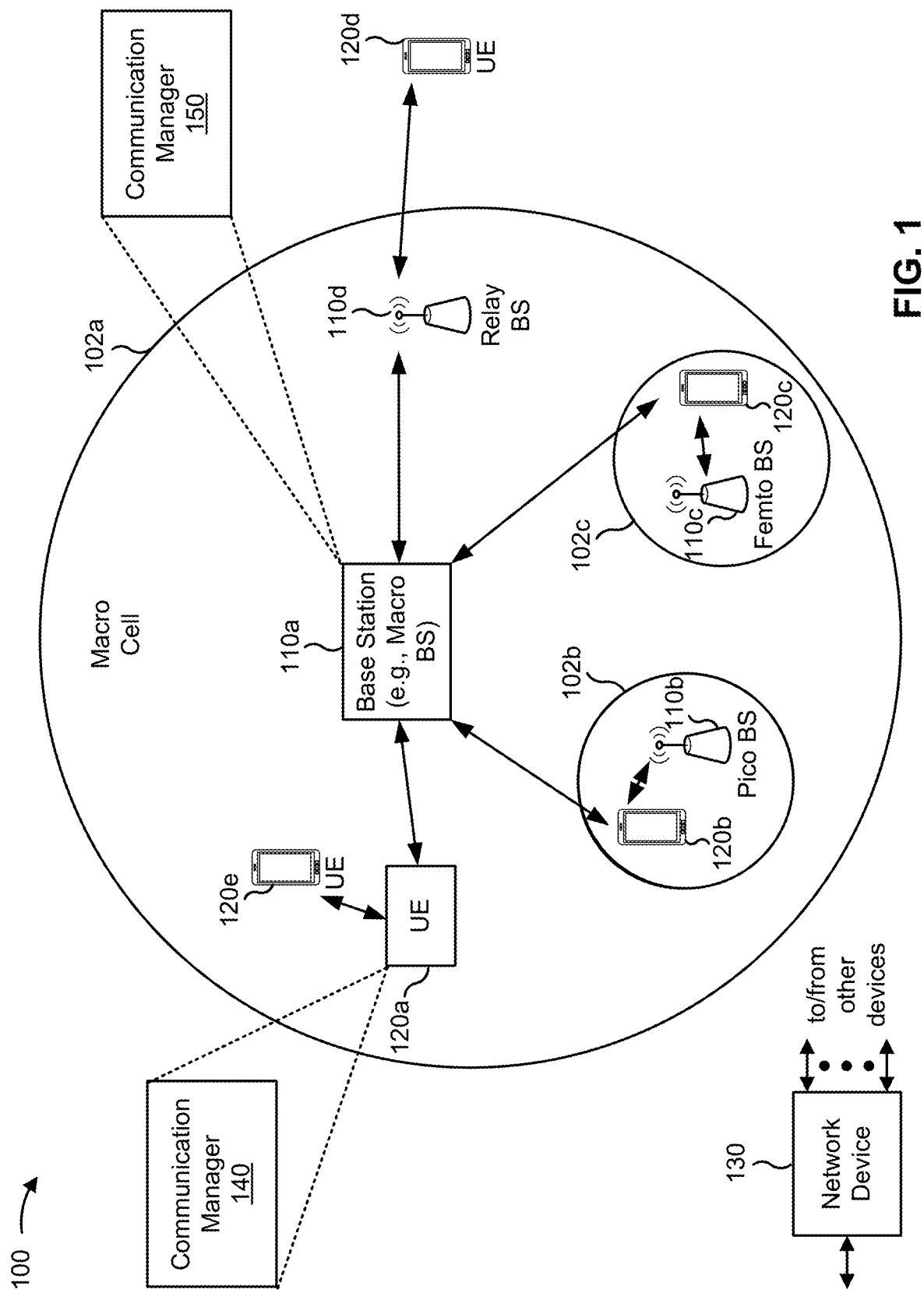
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network device 130 may be another device in the network that communicates with the UE 120. The network device 130 may be located in the core network. The network device 130 may be a device in a distributed network, such as a mesh network or an industrial IoT (IIoT) system. The network device 130 may communicate with other devices directly or via the base station 110.

A network controller may couple to or communicate with a set of base stations 110 and may provide coordination and control for these base stations 110. The network controller may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a programmable logic controller (PLC), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the first device may include a communication manager 140 (or a communication manager 150 depending on the type of device). As described in more detail elsewhere herein, the communication manager 140 or the communication manager 150 may receive, from a second device, a sounding reference signal (SRS) prior to a scheduled communication. The communication manager 140 or the communication manager 150 may transmit, to the second device, an indication that a measurement of the SRS does not satisfy a threshold if the measurement of the SRS does not satisfy the threshold. The communication manager 140 or the communication manager 150 may activate, based at least in part on the transmitting the indication and before the scheduled communication, a multi-point communication mode. Additionally, or alternatively, the communication manager 140 or the communication manager 150 may perform one or more other operations described herein.

In some aspects, the second device may include a communication manager 150 (or the communication manager 140 depending on the type of device). As described in more detail elsewhere herein, the communication manager 140 or the communication manager 150 may transmit, to a first device, an SRS prior to a scheduled communication. The communication manager 140 or the communication manager 150 may receive, from the first device, an indication that a measurement of the SRS does not satisfy a threshold. The communication manager 140 or the communication manager 150 may activate, based at least in part on the indication and before the scheduled communication, a multi-point communication mode. Additionally, or alternatively, the communication manager 140 or the communication manager 150 may perform one or more other operations described herein.

As indicated above, FIG. 1 is provided as an example. Other examples may differ from what is described with regard to FIG. 1.

Figure 2:
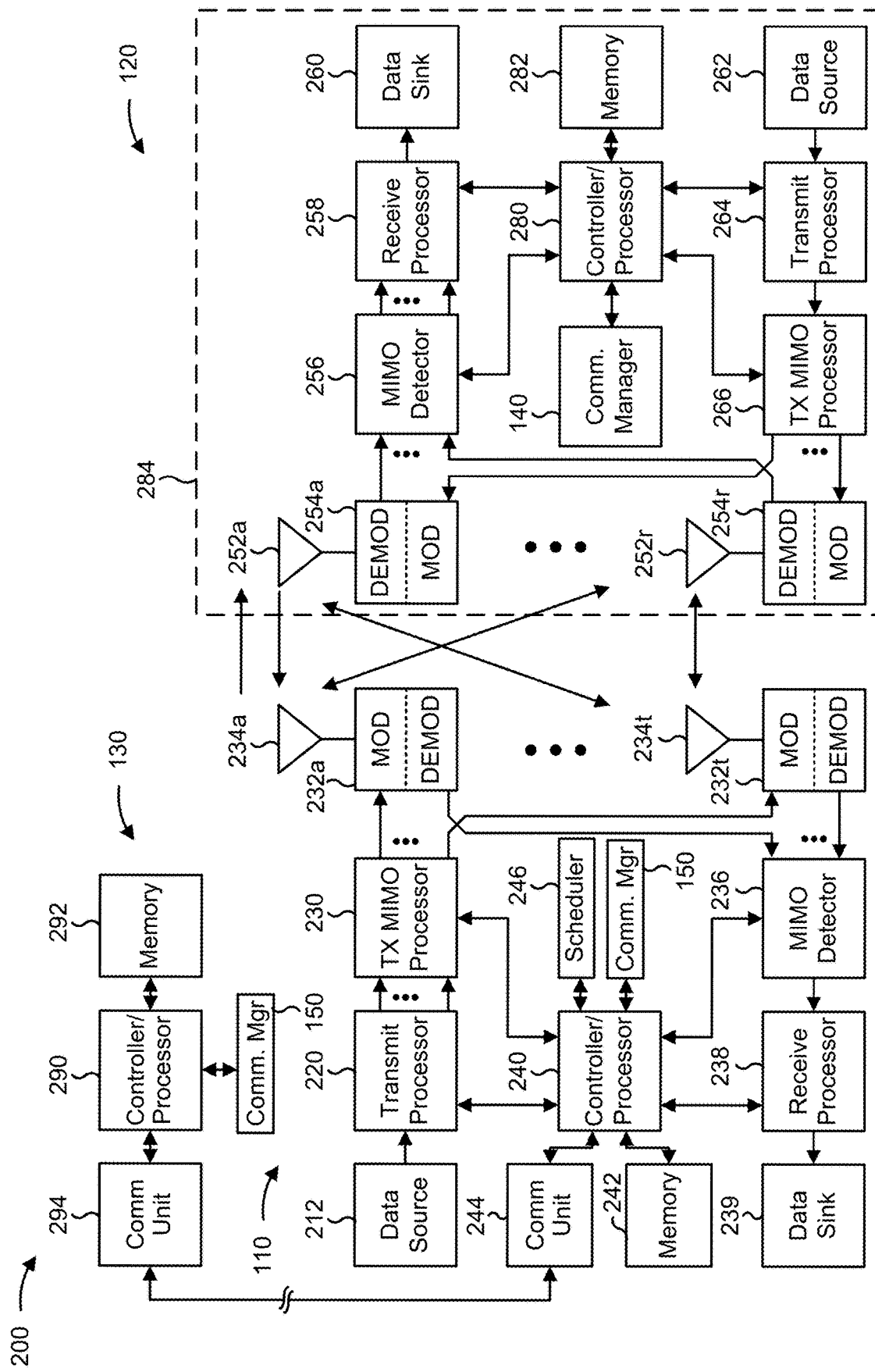
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network device 130 may include a communication unit 294, a controller/processor 290, and a memory 292. The network device 130 may include, for example, one or more devices in a core network. The network device 130 may communicate with the base station 110 via the communication unit 294. The network device 130 may include a communication manager 150.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, the control/processor 290 of the network device 130, and/or any other component(s) of FIG. 2 may perform one or more techniques associated with using a reference signal for activating a communication mode, as described in more detail elsewhere herein. In some aspects, the first device or the second device described herein is the UE 120, is included in the UE 120, or includes one or more components of the UE 120 shown in FIG. 2. In some aspects, the first device or the second device described herein is the base station 110 or the network device 130, is included in the base station 110 or the network device 130, or includes one or more components of the base station 110 or the network device 130 shown in FIG. 2. For example, the controller/processor 240 of the base station 110, the controller/processor 280 of the UE 120, the control/processor 290 of the network device 130, and/or any other component(s) of FIG. 2 may perform or direct operations of, for example, process 800 of FIG. 8, process 900 of FIG. 9, and/or other processes as described herein. The memory 242, the memory 282, and/or the memory 292 may store data and program codes for the base station 110 and the UE 120, respectively. In some examples, the memory 242, the memory 282, and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the network device 130 may cause the one or more processors, the base station 110, the UE 120, or the network device 130 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first device (e.g., UE 120, a TRP, a programmable logic controller (PLC), a base station 110, a network device 130) includes means for receiving, from a second device (e.g., a TRP, UE 120, a PLC, a base station 110, a network device 130), an SRS prior to a scheduled communication; means for transmitting, to the second device, an indication that a measurement of the SRS does not satisfy a threshold if the measurement of the SRS does not satisfy the threshold; and/or means for activating, based at least in part on the transmitting the indication and before the scheduled communication, a multi-point communication mode. In some aspects, the means for the first device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the first device to perform operations described herein may include, for example, one or more of communication manager 150, communication unit 294, controller/processor 290, or memory 292.

In some aspects, the second device (e.g., a TRP, UE 120, a PLC, a base station 110, a network device 130) includes means for transmitting, to a first device (e.g., UE 120, a TRP, a PLC, a base station 110, a network device 130), an SRS prior to a scheduled communication; means for receiving, from the first device, an indication that a measurement of the SRS does not satisfy a threshold; and/or means for activating, based at least in part on the indication and before the scheduled communication, a multi-point communication mode. In some aspects, the means for the second device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the first device to perform operations described herein may include, for example, one or more of communication manager 150, communication unit 294, controller/processor 290, or memory 292.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
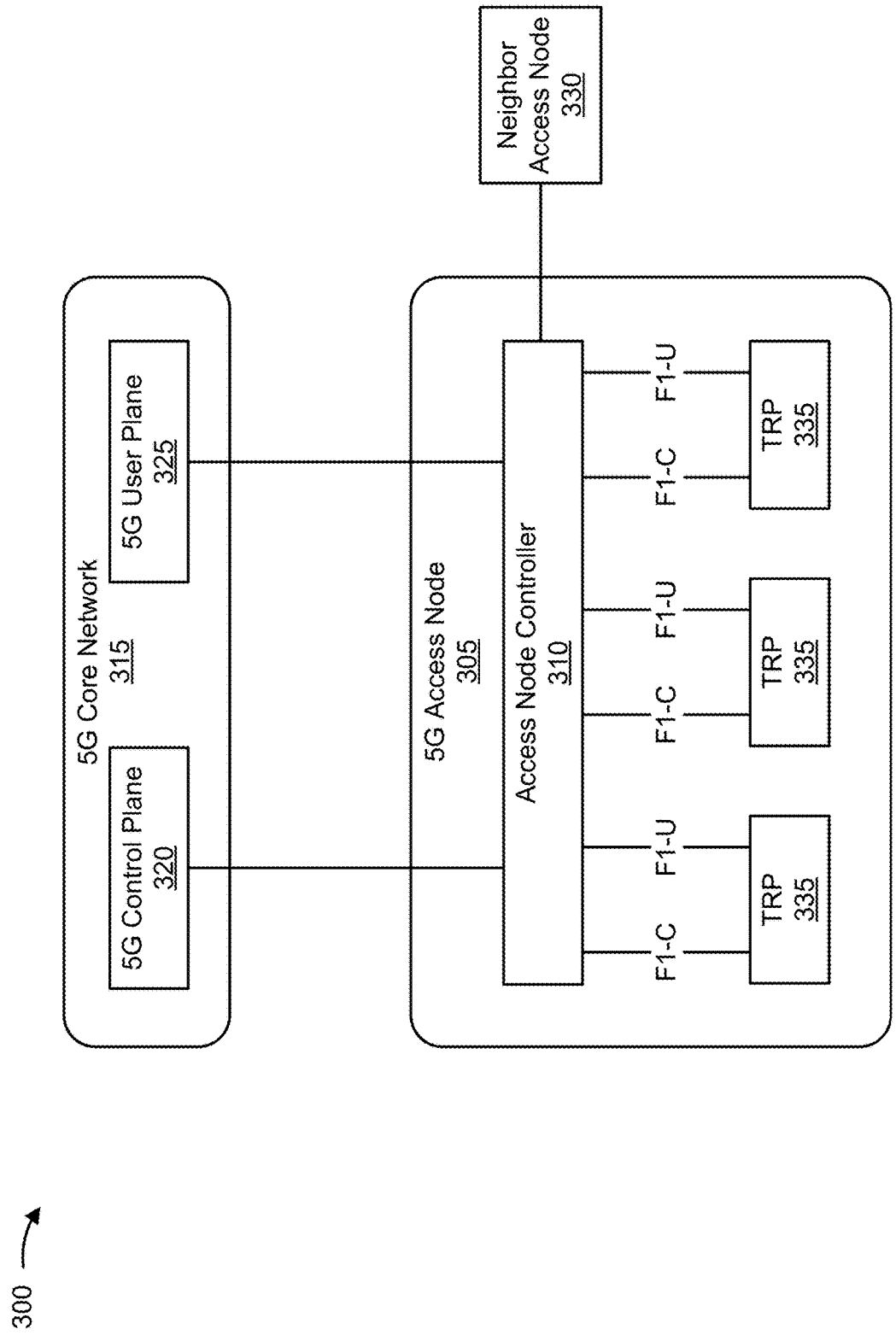
FIG. 3 illustrates an example logical architecture of a distributed radio access network (RAN), in accordance with the present disclosure.

FIG. 3 illustrates an example logical architecture of a distributed radio access network (RAN) 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
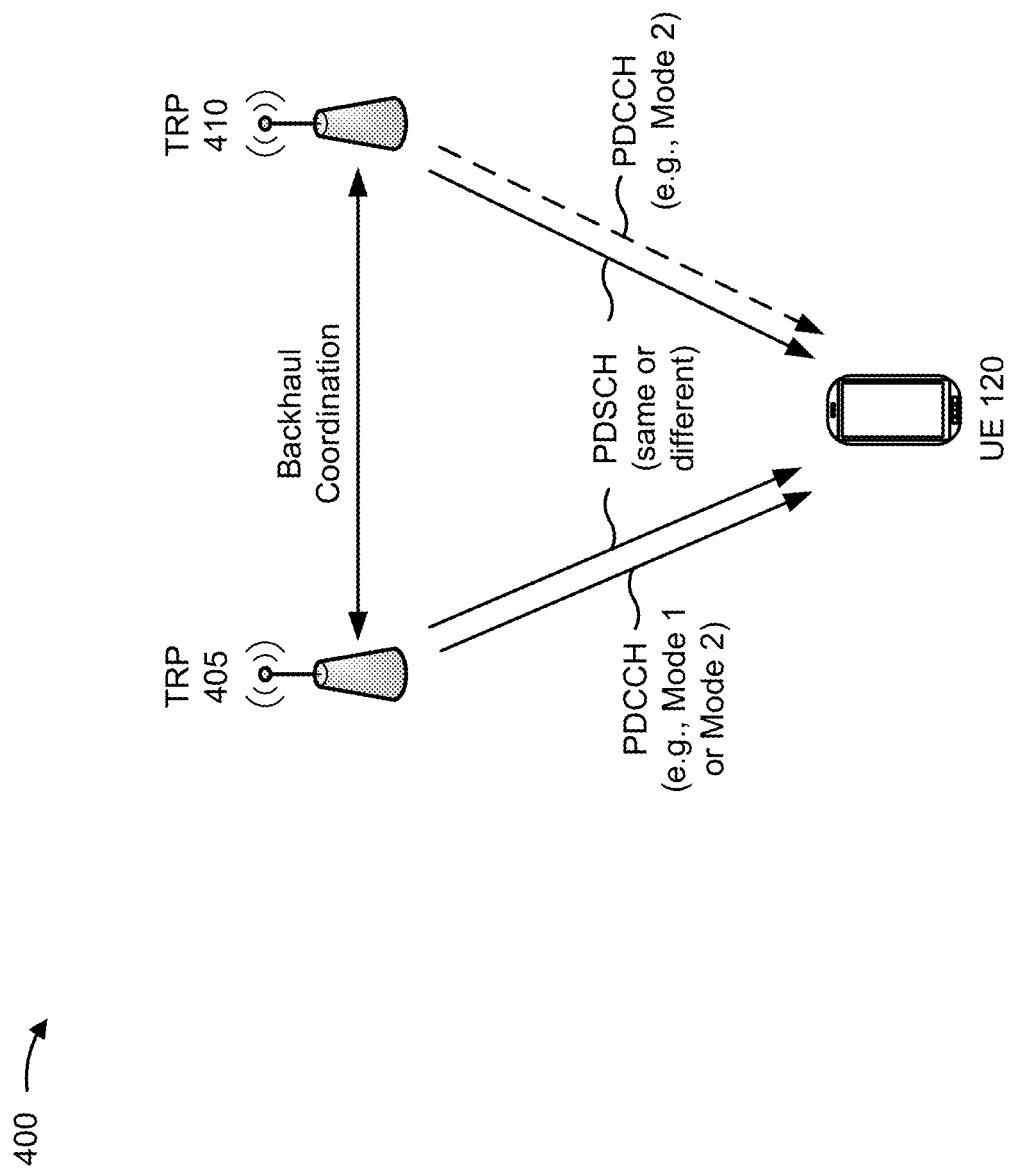
FIG. 4 is a diagram illustrating an example of multiple transmit receive point (mTRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs, such as TRP 405 and TRP 410, may communicate with the same UE 120. TRP 405 or TRP 410 may correspond to a TRP 335 described above in connection with FIG. 3.

TRP 405 and TRP 410 may communicate with the same UE 120 in a coordinated manner (e.g., using coordinated multipoint transmissions) to improve reliability against blocking, increase an overall rank or transmission power, and/or increase throughput. TRP 405 and TRP 410 may coordinate such communications via an interface between TRP 405 and TRP 410 (e.g., a backhaul interface and/or an access node controller 310). The interface may have a smaller delay and/or higher capacity when TRP 405 and TRP 410 are co-located at the same base station 110 (e.g., when TRP 405 and TRP 410 are different antenna arrays or panels of the same base station 110), and may have a larger delay and/or lower capacity (as compared to co-location) when TRP 405 and TRP 410 are located at different base stations 110. TRP 405 and TRP 410 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, TRP 405 and TRP 410 may transmit communications to the UE 120 on the same PDSCH. For example, a communication may be transmitted using a single codeword with different spatial layers for different TRPs (e.g., where one codeword maps to a first set of layers transmitted by TRP 405 and maps to a second set of layers transmitted by TRP 410). As another example, a communication may be transmitted using multiple codewords, where different codewords are transmitted by different TRPs (e.g., using different sets of layers). In either case, TRP 405 and TRP 410 may use different QCL relationships (e.g., different TCI states) for different DMRS ports corresponding to different layers. For example, TRP 405 may use a first QCL relationship or a first TCI state for a first set of DMRS ports corresponding to a first set of layers, and TRP 410 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed herein) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by TRP 405, and a second PDCCH may schedule a second codeword to be transmitted by TRP 410. Furthermore, first DCI (e.g., transmitted by TRP 405) may schedule a first PDSCH communication associated with a first set of DMRS ports with a first QCL relationship (e.g., indicated by a first TCI state) for TRP 405, and second DCI (e.g., transmitted by TRP 410) may schedule a second PDSCH communication associated with a second set of DMRS ports with a second QCL relationship (e.g., indicated by a second TCI state) for TRP 410. In this case, DCI (e.g., having DCI format 1_0 or DCI format 1_1) may indicate a corresponding TCI state for TRP 405 corresponding to the DCI. The TCI field of a DCI indicates the corresponding TCI state (e.g., the TCI field of the first DCI indicates the first TCI state and the TCI field of the second DCI indicates the second TCI state).

A single DCI may be used to schedule transmissions for each of TRP 405 and TRP 410 in a multi-TRP (mTRP) scenario. A single DCI-based mTRP transmission may involve a same MCS for each TRP and each PDSCH may correspond to a set of layers. In some scenarios, multiple DCIs may be used to schedule transmissions to each of TRP 405 and TRP 410. TRP 405 and TRP 410 may each use different PDSCHs or PDCCHs. A multi-DCI-based mTRP transmission may be used for joint hybrid automatic repeat request (HARQ) or separate HARQ.

Some IIoT applications may expect ultra-reliability. The data rate may not be high (e.g., few kilobytes per second (kbps) to a few megabytes per second (Mbps), but a $1 \times 10^{-6}$ block error rate (BLER) may be expected. IIoT applications may have stringent latency requirements (e.g., within 1 millisecond (ms)) and challenging radio frequency environments (e.g., blockage due to moving machinery). In such scenarios, mTRP may be deployed for reliable data transfer. A single TRP may be used when a communication link is good. However, if a link becomes bad, switching to other TRPs or relying on a negative acknowledgement (NACK) may introduce additional latency.

As indicated above, FIG. 4 is provided as an example. Other examples may differ from what is described with respect to FIG. 4.

Figure 5:
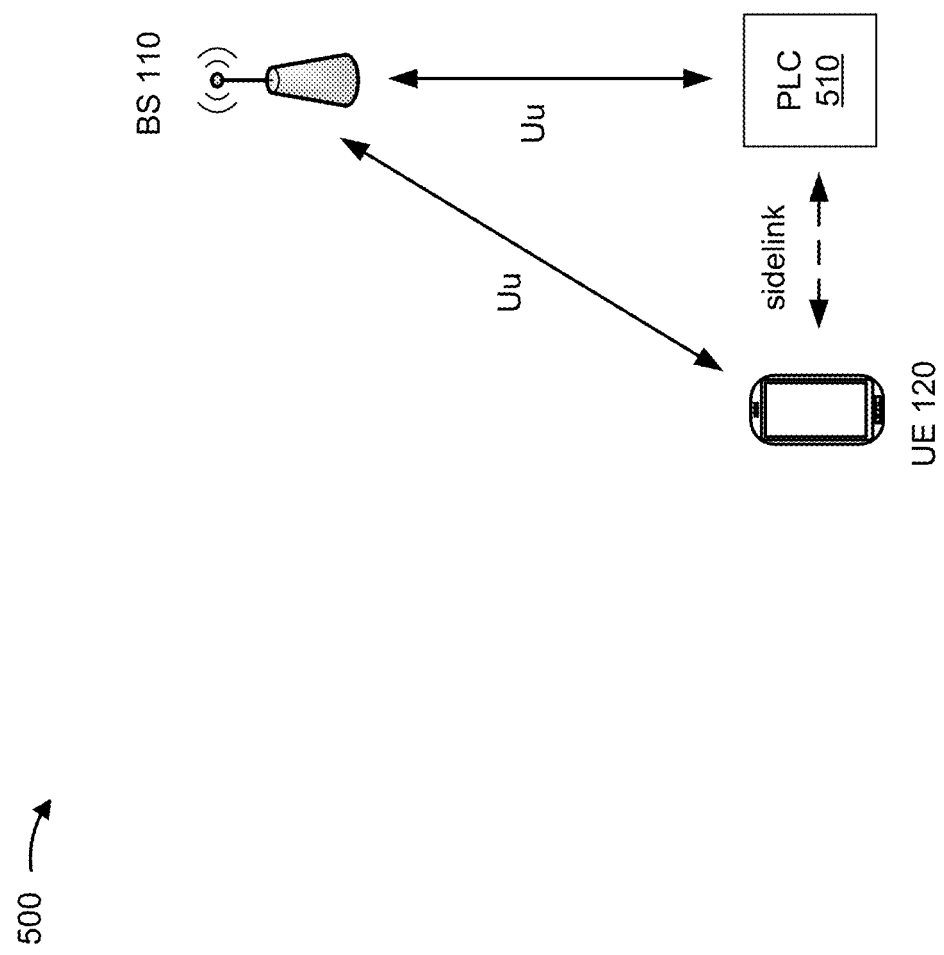
FIG. 5 is a diagram illustrating an example of multi-path diversity, in accordance with the present disclosure.

FIG. 5 is a diagram illustrating an example 500 of multi-path diversity, in accordance with the present disclosure. Example 500 shows a base station (e.g., base station 110) and a UE (e.g., UE 120) that may communicate with each other. The base station 110 and the UE 120 may also communicate with a sidelink UE (e.g., PLC 510).

Multi-path diversity may be used for a first device that communicates with a second device in a wireless communication network. A first device (e.g., UE 120) may communicate with a second device (e.g., PLC 510) via a sidelink. However, if the sidelink is blocked or not reliable, the UE 120 may use a two-hop Uu link to the PLC 510 via the base station 110 for better reliability. The UE 120 and/or the PLC 510 may be configured to use both the sidelink and the Uu links as necessary. Having access to either path or access to multiple points or paths at the same time may be referred to as a multi-point communication mode. If the UE 120 (or the PLC 510) is able to switch to the multi-point communication mode, the UE 120 and the PLC 510 may improve the reliability of communications. In a scenario with multiple TRPs, the UE 120 in multi-point communication mode (mTRP mode) may switch from one TRP to another TRP or access multiple TRPs at the same time.

Switching to the multi-point communication mode can reduce latency caused by link blockage. However, switching to the multi-point communication mode, after the transmission or reception of data has been blocked, may introduce additional latency.

According to some aspects described herein, a first device, such as the UE 120 or the PLC 510, may be configured to switch to a multi-point communication mode based at least in part on a reference signal that is transmitted and measured before a scheduled communication. The scheduled communication may be a scheduled transmission of data to, or a scheduled reception of data from, a second device. By measuring an SRS before a scheduled communication (e.g., with efficient channel sounding), the first device (and the second device) may utilize the multi-point communication mode to avoid using a link that is blocked or otherwise unsatisfactory. This will reduce latency. For example, the UE 120 may receive a reference signal, such as a low-overhead or light-weight SRS before the UE 120 is scheduled to transmit or receive a communication. The UE 120 may measure the SRS, and if the measurement indicates a bad link (e.g., measurement below a threshold), the UE 120 may transmit an indication of the bad link and switch to a multi-point communication mode before transmitting or receiving the scheduled communication using the multi-point communication mode. This may mean switching to mTRP, switching to a Uu relay link from a sidelink, or switching to duplication on the sidelink and the Uu relay link. The corresponding TRPs, base station, or PLC may also switch to the multi-point communication mode for the UE 120. That is, by the time of the scheduled communication, the UE 120 and any corresponding devices may have switched to the multi-point communication mode, if necessary. If the UE 120 determines that the link is good (e.g., measurement at or above a threshold) and there is no feedback regarding a bad link, the UE 120 may proceed with the scheduled communication without switching to the multi-point communication mode.

Alternatively, or additionally, the UE 120 may transmit an SRS and the TRP, the base station, the PLC, or other network device may measure the SRS and provide an indication of whether the link is good (e.g., satisfies a threshold). The indication may be a measurement or a direct indication to switch to a multi-point communication mode. The UE 120 may receive the indication and switch to the multi-point communication mode.

As indicated above, FIG. 5 is provided as an example. Other examples may differ from what is described with regard to FIG. 5.

Figure 6:
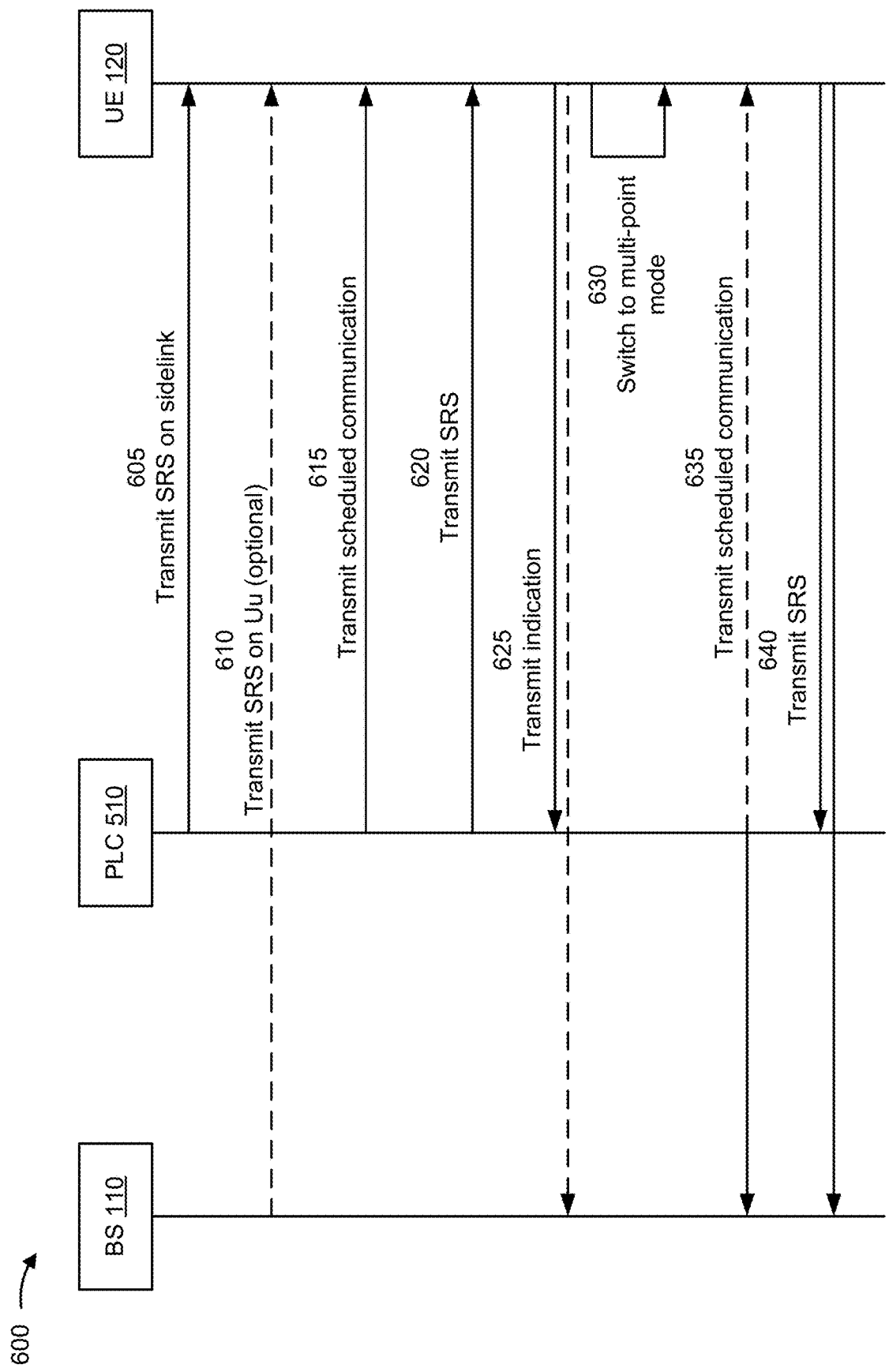
FIG. 6 is a diagram illustrating an example associated with using a reference signal for switching to a multi-point communication mode, in accordance with the present disclosure.

FIG. 6 is a diagram illustrating an example 600 associated with using a reference signal for switching to a multi-point communication mode, in accordance with the present disclosure. As shown in example 600, a UE (e.g., UE 120) and a sidelink UE (e.g., PLC 510) may communicate with each other over a sidelink. A base station (e.g., BS 110) may communicate with the PLC 510 or the UE 120 over a Uu link.

As shown by reference number 605, the PLC 510 may transmit an SRS on a sidelink to the UE 120. The PLC 510 may transmit the SRS before a scheduled communication. The (downlink) SRS may be comparable to an uplink SRS that is usually transmitted by the UE 120. Alternatively, or additionally, as shown by reference number 610, the base station 110 may transmit the SRS on a Uu link, and the SRS may be a synchronization signal block (SSB), a channel state information (CSI) reference signal (CSI-RS), a demodulation reference signal (DMRS), a positioning reference signal (PRS), or a phase tracking reference signal (PTRS), among other examples. An SSB may carry information used for initial network acquisition and synchronization, such as a primary synchronization signal (PSS), a secondary synchronization signal (SSS), a physical broadcast channel (PBCH), and a PBCH DMRS. An SSB is sometimes referred to as a synchronization signal/PBCH (SS/PBCH) block. A CSI-RS may carry information used for downlink channel estimation (e.g., downlink CSI acquisition), which may be used for scheduling, link adaptation, or beam management, among other examples. The base station may configure a set of CSI-RSs for the UE, and the UE may measure the configured set of CSI-RSs. Based at least in part on the measurements, the UE 120 may perform channel estimation and may report channel estimation parameters to the base station (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. In some aspects, the SRS may be a low-overhead or light-weight reference signal, which uses fewer resources or bits than an SSB or an CSI-RS. The SRS may be a part of an SRS resource set.

The UE 120 may measure the SRS and if the measurement (e.g., RSRP, RSRQ, signal-to-interference ratio (SNR)) satisfies a threshold (e.g., minimum RSRP, minimum RSRQ, minimum SNR, maximum interference, maximum blockage) for using the sidelink, sidelink operation may be sufficient. As shown by reference number 615, the PLC 510 may receive the communication on the sidelink as scheduled.

As shown by reference number 620, the PLC 510 may transmit another SRS to the UE 120 prior to another scheduled communication. A measurement for this SRS may not satisfy the threshold and the sidelink may be considered a "bad" link. As shown by reference number 625, the UE 120 may transmit an indication to the PLC 510 and/or the base station 110. The indication may include a measurement, a notice that the UE 120 is to switch to a multi-point communication mode, or a request to switch to the multi-point communication mode. As shown by reference number 630, the UE 120 may switch to the multi-point communication mode. The base station 110 and the PLC may also switch to the multi-point communication mode for the UE 120.

As shown by reference number 635, while in the multi-point communication mode, the UE 120 may receive the communication (e.g., DCI, data) from the PLC 510 on Uu links via the base station 110. That is, the PLC 510 may relay the packet via the base station 110. The PLC 510 may initiate one transmission toward both the UE 120 and the base station 110.

Alternatively, the base station 110 or the PLC 510 may configure the UE 120 for SRS transmission to the base station 110 and/or the PLC 510. As shown by reference number 640, the UE 120 may transmit an SRS. The SRS may be an SRS that is similar to other SRSs transmitted by the UE 120 for beam management. The SRS may be a low-overhead or light-weight SRS that uses fewer resources than other SRSs used by the UE 120. The SRS may be shared with other UEs. The SRS may be configured with an offset and a periodicity that is based at least in part on a configured grant (CG) or semi-persistent scheduling (SPS) configuration of the UE 120. For example, the UE 120 may transmit at least one SRS before each CG or SPS resource. The UE 120 may use the same frequency range or a wider frequency range than the frequency range for the CG or SPS frequency resource allocation.

The base station 110 or the PLC 510 may measure the SRS and provide an indication to the UE 120 that the UE 120 is to switch to a multi-point communication mode if the measurement of the SRS on the sidelink does not satisfy a threshold (link is bad). The UE 120 may switch to the multi-point communication mode.

Alternatively, or additionally, the UE 120 may transmit an SRS and the TRP, the base station, the PLC, or other network device may measure the SRS and transmit an indication of whether the link is "bad" (e.g., does not satisfy the threshold) or "good" (e.g., satisfies a threshold). The indication may be a measurement or a direct indication to switch to a multi-point communication mode. The UE 120 may receive the indication and switch to the multi-point communication mode.

As indicated above, FIG. 6 is provided as an example. Other examples may differ from what is described with respect to FIG. 6.

Figure 7:
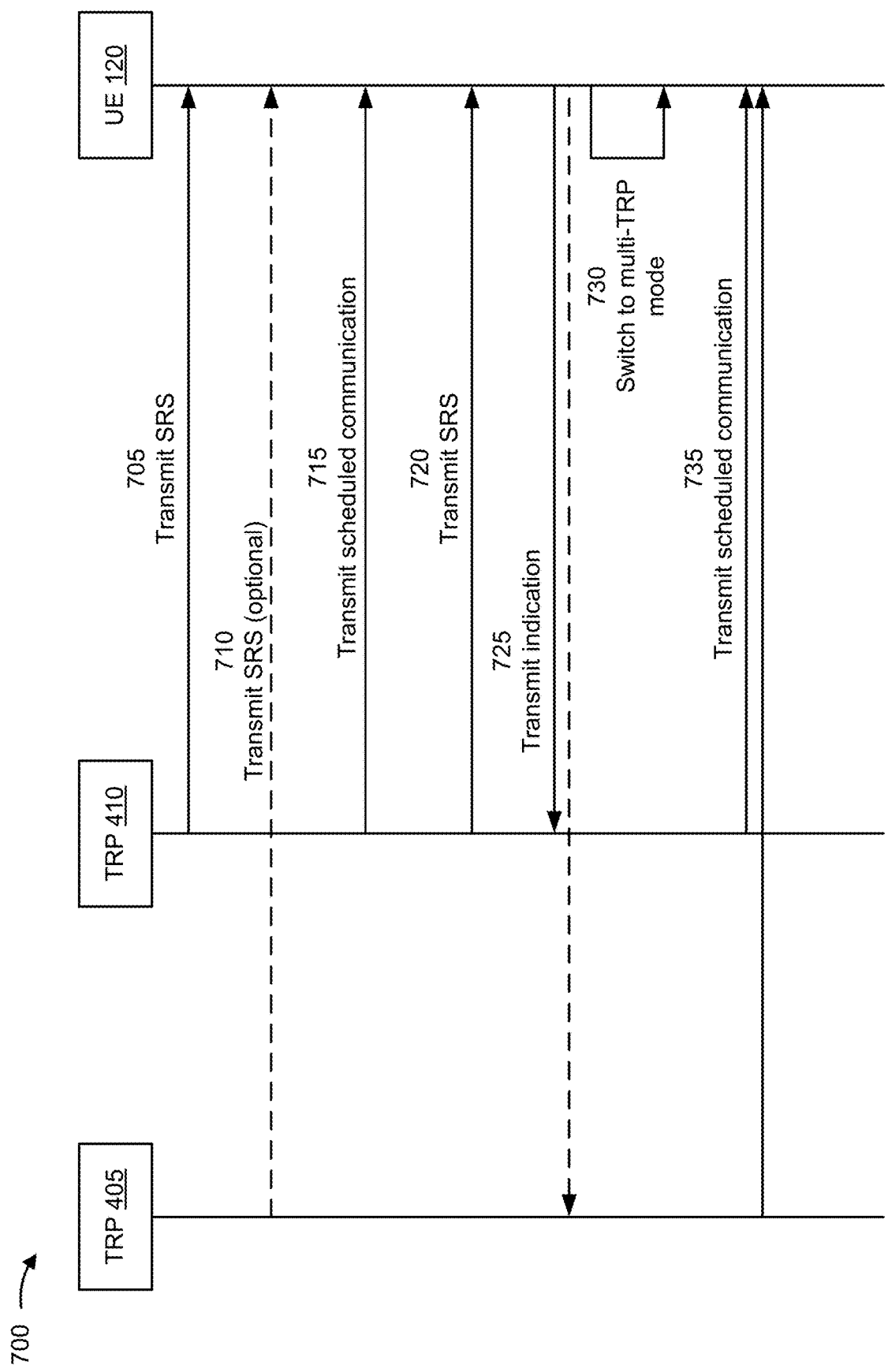
FIG. 7 is a diagram illustrating an example of using a reference signal for switching to a multi-point communication mode, in accordance with the present disclosure.

FIG. 7 is a diagram illustrating an example 700 of using a reference signal for switching to a multi-point communication mode, in accordance with the present disclosure. As shown in example 700, a first TRP (e.g., TRP 405) and a second TRP (e.g., TRP 410) may be capable of communicating with the UE 120.

As shown by reference number 705, TRP 410 may transmit an SRS to the UE 120 before a scheduled communication, such as a scheduled CG or SPS reception or transmission. In example 700, the communication is a reception. TRP 405 may also transmit an SRS, as shown by reference number 710.

The UE 120 may measure the SRS and if the measurement satisfies a threshold (e.g., minimum RSRP, minimum RSRQ, minimum SNR, maximum interference, maximum blockage), as shown by reference number 715, the UE 120 may expect to receive the communication from TRP 410 as scheduled.

As shown by reference number 720, TRP 410 may transmit another SRS. If the measurement of this SRS does not satisfy the threshold (link is bad due to blockage or some other reason), the UE 120 may transmit an indication that the measurement of the SRS does not satisfy the threshold, as shown by reference number 725. The UE 120 may transmit the indication to TRP 410, TRP 405, or to both TRP 410 and TRP 405 for more reliability. The UE 120 may also transmit the indication to a base station via another TRP. For example, only TRP 410 (the serving TRP) may transmit the SRS, and the UE 120 may monitor for link quality only from TRP 410. If the link is failing, TRP selection may not be available, but joint transmission from TRP 405 and TRP 410 may be available. In another example, one or more TRPs may transmit the SRS (e.g., TRP 405 and TRP 410). Each TRP may have a different set of SRS resources. In some aspects, the UE 120 may be configured with multiple SRS resources, where one SRS resource set corresponds to "bad" CSI feedback. If the link is failing, TRP selection may not be available, but joint transmission from TRP 405 and TRP 410 may be available in an mTRP mode.

As shown by reference number 730, the UE 120 may switch to a multi-point communication mode, such as an mTRP mode. TRP 405 and TRP 410 may also switch to the mTRP mode (e.g., at the direction of the base station). As shown by reference number 735, TRP 405, TRP 410, or both TRP 405 and TRP 410 may transmit the communication (e.g., DCI, data) to the UE 120.

Alternatively, or additionally, the UE 120 may transmit SRSs to TRP 405 and/or TRP 410, and TRP 405 and/or TRP 410 may measure the SRSs and transmit an indication of whether a link is "bad" (e.g., does not satisfy the threshold) or "good" (e.g., satisfies a threshold). The indication may include a measurement or a direct indication to switch to the mTRP mode. In some aspects, the indication may include a single bit to indicate a bad link (e.g., RSRP below a threshold). This may help to reduced feedback overhead if the link quality is good for most of the time. In some aspects, the indication may include multiple bits that indicate a range of RSRP values so that mTRP operation can be adjusted to the link quality. In some aspects, the indication may include multiple bits that indicate better links to certain TRPs for TRP selection or preferred mTRP transmission. The UE 120 may receive the indication and switch to the mTRP mode. In some aspects, the UE 120, TRP 405, and TRP 410 may switch back to a single-TRP mode based at least in part on an absence of feedback indicating a bad link. The link may have returned to a satisfactory condition.

In some aspects, the UE 120 may use a waveform for multiplexing UE feedback. For example, the UE 120 may use a sequence-based indication. The indication may be based at least in part on a low peak-to-average-power ratio (PAPR) sequence. Multiple UEs may share the same set of resources, and the base station may assign the UEs non-orthogonal sequences such that the base station is reliably able to detect a certain quantity of UE feedback indications. Physical uplink control channel (PUCCH) repetition and/or frequency hopping may be enabled. One or more TRPs (or base stations or PLCs) may receive the PUCCH repetitions.

In some aspects, the UE 120 may initiate a random access channel (RACH) procedure that requests a resource for the feedback. A specific RACH preamble may correspond to "bad" CSI feedback.

As indicated above, FIG. 7 is provided as an example. Other examples may differ from what is described with respect to FIG. 7.

Figure 8:
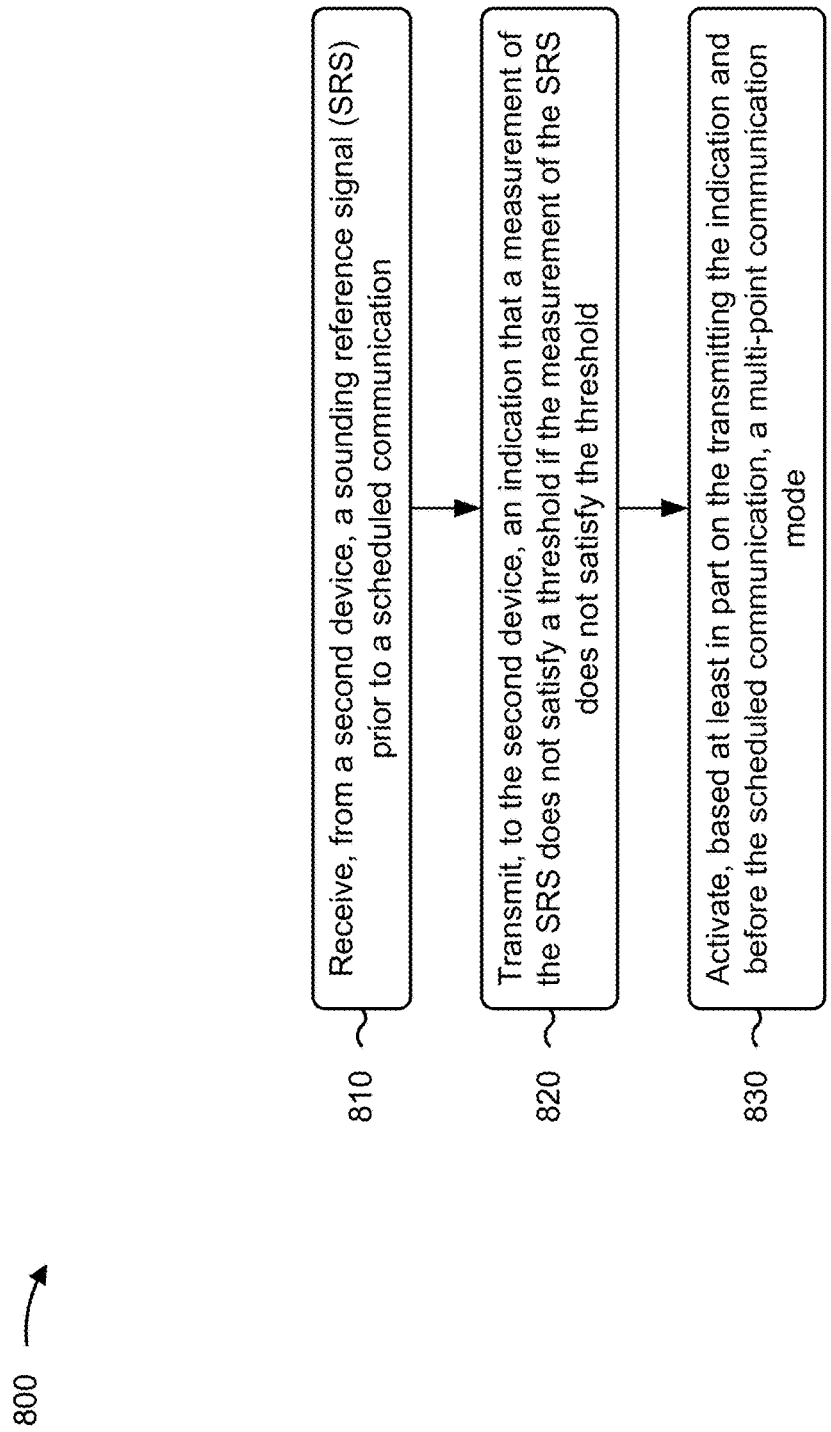
FIG. 8 is a diagram illustrating an example process performed, for example, by a first device, in accordance with the present disclosure.

FIG. 8 is a diagram illustrating an example process 800 performed, for example, by a first device, in accordance with the present disclosure. Example process 800 is an example where the first device (e.g., UE 120, a TRP, a PLC, a base station 110) performs operations associated with using SRSs for activating a multi-point communication mode.

As shown in FIG. 8, in some aspects, process 800 may include receiving, from a second device, an SRS prior to a scheduled communication (block 810). For example, the first device (e.g., using communication manager 140 or 150 and/or reception component 1002 depicted in FIG. 10) may receive, from a second device, an SRS prior to a scheduled communication, as described above.

As further shown in FIG. 8, in some aspects, process 800 may include transmitting, to the second device, an indication that a measurement of the SRS does not satisfy a threshold, if the measurement of the SRS does not satisfy the threshold (block 820). For example, the first device (e.g., using communication manager 140 or 150 and/or transmission component 1004 depicted in FIG. 10) may transmit, to the second device, an indication that a measurement of the SRS does not satisfy a threshold, if the measurement of the SRS does not satisfy the threshold, as described above.

As further shown in FIG. 8, in some aspects, process 800 may include activating, based at least in part on the transmitting the indication and before the scheduled communication, a multi-point communication mode (block 830). For example, the first device (e.g., using communication manager 140 or 150 and/or activation component 1008 depicted in FIG. 10) may activate, based at least in part on the transmitting the indication and before the scheduled communication, a multi-point communication mode, as described above.

Process 800 may include additional aspects, such as any single aspect or any combination of aspects described below and/or in connection with one or more other processes described elsewhere herein.

In a first aspect, the first device is a UE operating in a single-point communication mode, the second device is a TRP, and the activating the multi-point communication mode includes switching to a multi-TRP communication mode.

In a second aspect, alone or in combination with the first aspect, the first device is a TRP, the second device is a UE operating in a single-point communication mode, and the indication causes the UE to switch to a multi-TRP communication mode.

In a third aspect, alone or in combination with one or more of the first and second aspects, process 800 includes transmitting, to the UE, a message that configures the UE to transmit the SRS before the scheduled communication.

In a fourth aspect, alone or in combination with one or more of the first through third aspects, the first device is operating in a single-point communication mode, the second device is a sidelink UE or a base station, and the activating the multi-point communication mode includes communicating with the sidelink UE via the base station on a Uu link.

In a fifth aspect, alone or in combination with one or more of the first through fourth aspects, the first device is a sidelink UE or a base station, the second device is operating in a single-point communication mode, and the indication causes the second device to communicate with the sidelink UE via the base station on a Uu link.

In a sixth aspect, alone or in combination with one or more of the first through fifth aspects, the SRS includes fewer time-frequency resources than an SSB, a CSI-RS, or a DMRS.

In a seventh aspect, alone or in combination with one or more of the first through sixth aspects, the SRS is an SSB, a CSI-RS, or a DMRS.

In an eighth aspect, alone or in combination with one or more of the first through seventh aspects, one or more of an offset for the SRS, a bandwidth for the SRS, or a periodicity for the SRS is based at least in part on a CG configuration for the first device or an SPS configuration.

In a ninth aspect, alone or in combination with one or more of the first through eighth aspects, the indication includes a single bit or includes one or more bits indicating an RSRP or other devices.

In a tenth aspect, alone or in combination with one or more of the first through ninth aspects, the indication is a sequence-based indication or a RACH preamble.

In an eleventh aspect, alone or in combination with one or more of the first through tenth aspects, the SRS is part of a resource set that corresponds to indications to switch a communication mode.

In a twelfth aspect, alone or in combination with one or more of the first through eleventh aspects, process 800 includes receiving an indication of a value for the threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
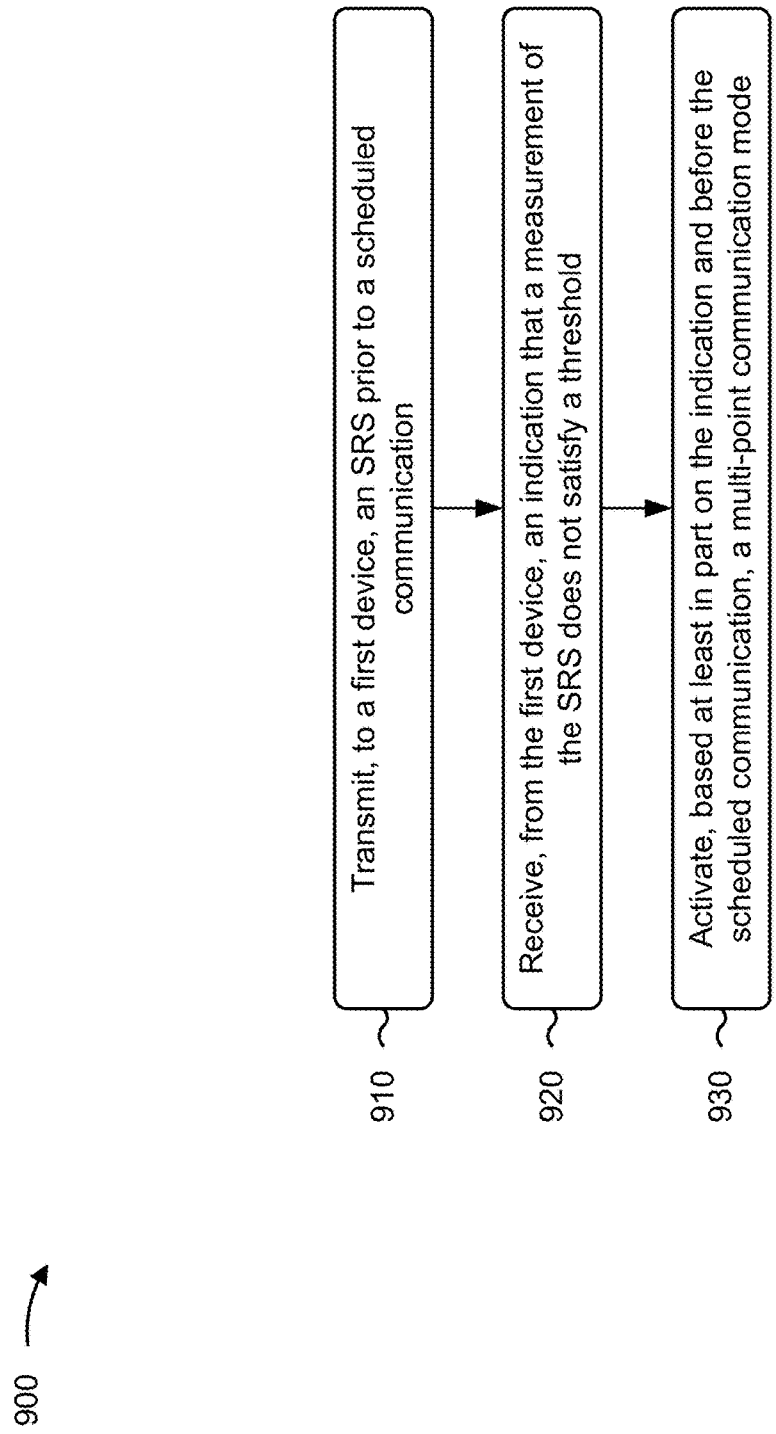
FIG. 9 is a diagram illustrating an example process performed, for example, by a second device, in accordance with the present disclosure.

FIG. 9 is a diagram illustrating an example process 900 performed, for example, by a second device, in accordance with the present disclosure. Example process 900 is an example where the second device (e.g., a TRP, a PLC, a base station 110, UE 120) performs operations associated with using SRSs for activating a multi-point communication mode.

As shown in FIG. 9, in some aspects, process 900 may include transmitting, to a first device, an SRS prior to a scheduled communication (block 910). For example, the second device (e.g., using communication manager 140 or 150 and/or transmission component 1104 depicted in FIG. 11) may transmit, to a first device, an SRS prior to a scheduled communication, as described above.

As further shown in FIG. 9, in some aspects, process 900 may include receiving, from the first device, an indication that a measurement of the SRS does not satisfy a threshold (block 920). For example, the second device (e.g., using communication manager 140 or 150 and/or reception component 1102 depicted in FIG. 11) may receive, from the first device, an indication that a measurement of the SRS does not satisfy a threshold, as described above.

As further shown in FIG. 9, in some aspects, process 900 may include activating, based at least in part on the indication and before the scheduled communication, a multi-point communication mode (block 930). For example, the second device (e.g., using communication manager 140 or 150 and/or activation component 1108 depicted in FIG. 11) may activate, based at least in part on the indication and before the scheduled communication, a multi-point communication mode, as described above.

Process 900 may include additional aspects, such as any single aspect or any combination of aspects described below and/or in connection with one or more other processes described elsewhere herein.

In a first aspect, the first device is a UE operating in a single-point communication mode, and the second device is a TRP.

In a second aspect, alone or in combination with the first aspect, the activating the multi-point communication mode includes transmitting a message that causes the UE to switch to a multi-TRP communication mode.

In a third aspect, alone or in combination with one or more of the first and second aspects, the second device is a serving TRP for the UE.

In a fourth aspect, alone or in combination with one or more of the first through third aspects, the second device is a not a serving TRP for the UE.

In a fifth aspect, alone or in combination with one or more of the first through fourth aspects, the first device is a TRP, the second device is a UE operating in a single-point communication mode, and the activating the multi-point communication mode includes switching to a multi-TRP communication mode.

In a sixth aspect, alone or in combination with one or more of the first through fifth aspects, process 900 includes receiving a message that configures the second device to transmit the SRS before the scheduled communication.

In a seventh aspect, alone or in combination with one or more of the first through sixth aspects, the first device is operating in a single-point communication mode, and the second device is a PLC or a base station.

In an eighth aspect, alone or in combination with one or more of the first through seventh aspects, the activating the multi-point communication mode includes transmitting a message that causes the first device to communicate with the PLC via the base station on a Uu link.

In a ninth aspect, alone or in combination with one or more of the first through eighth aspects, the first device is a sidelink UE or a base station, the second device is operating in a single-point communication mode, and the activating the multi-point communication mode includes communicating with the sidelink UE via the base station on a Uu link.

In a tenth aspect, alone or in combination with one or more of the first through ninth aspects, the SRS includes fewer time-frequency resources than an SSB, a CSI-RS, or a DMRS.

In an eleventh aspect, alone or in combination with one or more of the first through tenth aspects, the SRS is an SSB, a CSI-RS, or a DMRS.

In a twelfth aspect, alone or in combination with one or more of the first through eleventh aspects, one or more of an offset for the SRS, a bandwidth for the SRS, or a periodicity for the SRS is based at least in part on a CG configuration for the first device or an SPS configuration.

In a thirteenth aspect, alone or in combination with one or more of the first through twelfth aspects, the indication includes a single bit or includes one or more bits indicating an RSRP or other devices.

In a fourteenth aspect, alone or in combination with one or more of the first through thirteenth aspects, the indication is a sequence-based indication or a RACH preamble.

In a fifteenth aspect, alone or in combination with one or more of the first through fourteenth aspects, the SRS is part of a resource set that corresponds to indications to a switch communication mode.

In a sixteenth aspect, alone or in combination with one or more of the first through fifteenth aspects, process 900 includes transmitting an indication of a value for the threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
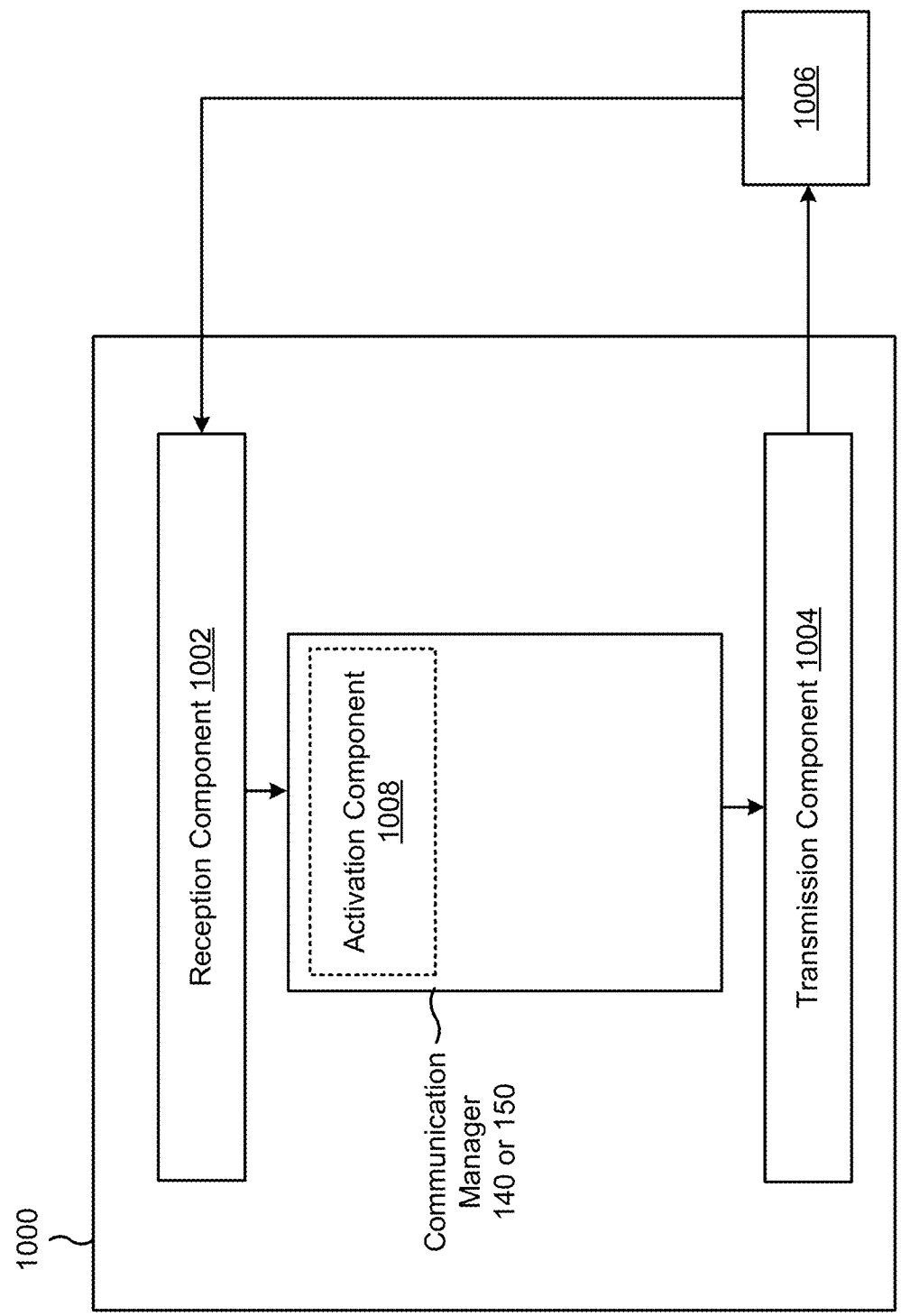
FIGS. 10-11 are diagrams of example apparatuses for wireless communication, in accordance with the present disclosure.

FIG. 10 is a diagram of an example apparatus 1000 for wireless communication. The apparatus 1000 may be a first device, or a first device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140 or the communication manager 150. The communication manager 140 or the communication manager 150 may include an activation component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first device described in connection with FIG. 2. In some aspects, the transmission component 1004 may be co-located with the reception component 1002 in a transceiver.

The reception component 1002 may receive, from a second device, an SRS prior to a scheduled communication. The transmission component 1004 may transmit, to the second device, an indication that a measurement of the SRS does not satisfy a threshold if the measurement of the SRS does not satisfy the threshold. The activation component 1008 may activate, based at least in part on the transmitting the indication and before the scheduled communication, a multi-point communication mode.

The transmission component 1004 may transmit, to the UE, a message that configures the UE to transmit the SRS before the scheduled communication. The reception component 1002 may receive an indication of a value for the threshold.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
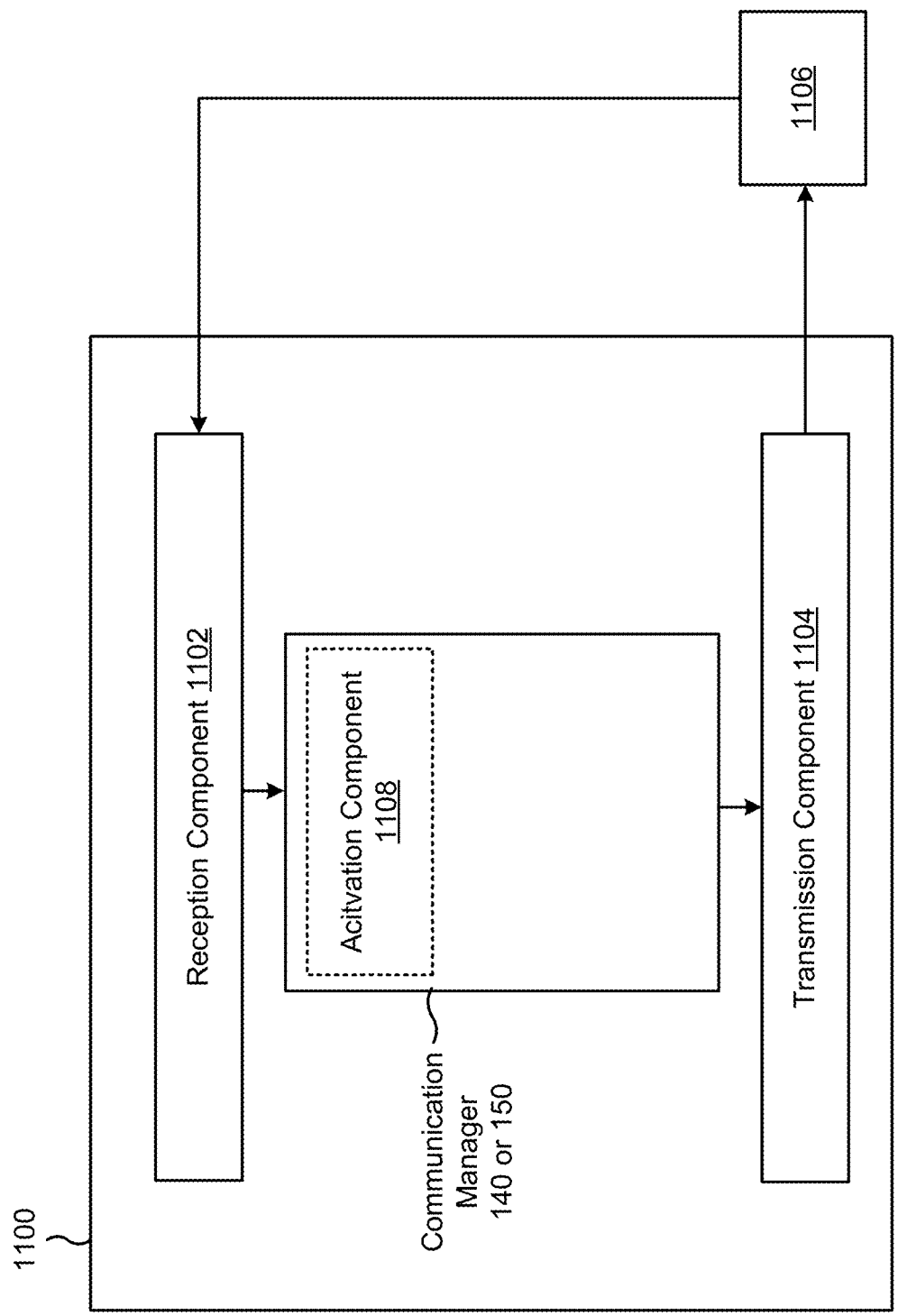

FIG. 11 is a diagram of an example apparatus 1100 for wireless communication. The apparatus 1100 may be a second device, or a second device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140 or the communication manager 150. The communication manager 140 or the communication manager 150 may include an activation component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second device described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second device described in connection with FIG. 2. In some aspects, the transmission component 1104 may be co-located with the reception component 1102 in a transceiver.

The transmission component 1104 may transmit, to a first device, an SRS prior to a scheduled communication. The reception component 1102 may receive, from the first device, an indication that a measurement of the SRS does not satisfy a threshold. The activation component 1108 may activate, based at least in part on the indication and before the scheduled communication, a multi-point communication mode.

The reception component 1102 may receive a message that configures the second device to transmit the SRS before the scheduled communication. The transmission component 1104 may transmit an indication of a value for the threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a first device, comprising: receiving, from a second device, prior to a scheduled communication; transmitting, to the second device, an indication that a measurement of the SRS does not satisfy a threshold if the measurement of the SRS does not satisfy the threshold; and activating, based at least in part on the transmitting the indication and before the scheduled communication, a multi-point communication mode.

Aspect 2: The method of Aspect 1, wherein the first device is a user equipment (UE) operating in a single-point communication mode, the second device is a transmit receive point (TRP), and the activating the multi-point communication mode includes switching to a multi-TRP communication mode.

Aspect 3: The method of Aspect 1, wherein the first device is a transmit receive point (TRP), the second device is a user equipment (UE) operating in a single-point communication mode, and the indication causes the UE to switch to a multi-TRP communication mode.

Aspect 4: The method of Aspect 3, further comprising transmitting, to the UE, a message that configures the UE to transmit the SRS before the scheduled communication.

Aspect 5: The method of Aspect 1, wherein the first device is operating in a single-point communication mode, the second device is a sidelink UE or a base station, and the activating the multi-point communication mode includes communicating with the sidelink UE via the base station on a Uu link.

Aspect 6: The method of Aspect 1, wherein the first device is a sidelink UE or a base station, the second device is operating in a single-point communication mode, and the indication causes the second device to communicate with the sidelink UE via the base station on a Uu link.

Aspect 7: The method of any of Aspects 1-6, wherein the SRS includes fewer time-frequency resources than a synchronization signal block, a channel state information reference signal, or a demodulation reference signal.

Aspect 8: The method of any of Aspects 1-7, wherein the SRS is a synchronization signal block, a channel state information reference signal, or a demodulation reference signal.

Aspect 9: The method of any of Aspects 1-8, wherein one or more of an offset for the SRS, a bandwidth for the SRS, or a periodicity for the SRS is based at least in part on a configured grant configuration for the first device or a semi-persistent scheduling configuration.

Aspect 10: The method of any of Aspects 1-9, wherein the indication includes a single bit or includes one or more bits indicating a reference signal received power or other devices.

Aspect 11: The method of any of Aspects 1-10, wherein the indication is a sequence-based indication or a random access channel preamble.

Aspect 12: The method of any of Aspects 1-11, wherein the SRS is part of a resource set that corresponds to indications to switch a communication mode.

Aspect 13: The method of any of Aspects 1-12, further comprising receiving an indication of a value for the threshold.

Aspect 14: A method of wireless communication performed by a second device, comprising: transmitting, to a first device, a sounding reference signal (SRS) prior to a scheduled communication; receiving, from the first device, an indication that a measurement of the SRS does not satisfy a threshold; and activating, based at least in part on the indication and before the scheduled communication, a multi-point communication mode.

Aspect 15: The method of Aspect 14, wherein the first device is a user equipment (UE) operating in a single-point communication mode, and the second device is a transmit receive point (TRP).

Aspect 16: The method of Aspect 15, wherein the activating the multi-point communication mode includes transmitting a message that causes the UE to switch to a multi-TRP communication mode.

Aspect 17: The method of Aspect 15 or 16, wherein the second device is a serving TRP for the UE.

Aspect 18: The method of Aspect 15 or 16, wherein the second device is a not a serving TRP for the UE.

Aspect 19: The method of Aspect 14, wherein the first device is a transmit receive point (TRP), the second device is a user equipment (UE) operating in a single-point communication mode, and the activating the multi-point communication mode includes switching to a multi-TRP communication mode.

Aspect 20: The method of Aspect 19, further comprising receiving a message that configures the second device to transmit the SRS before the scheduled communication.

Aspect 21: The method of Aspect 14, wherein the first device is operating in a single-point communication mode, and the second device is a programmable logic controller (PLC) or a base station.

Aspect 22: The method of Aspect 21, wherein the activating the multi-point communication mode includes transmitting a message that causes the first device to communicate with the PLC via the base station on a Uu link.

Aspect 23: The method of Aspect 14, wherein the first device is a sidelink UE or a base station, the second device is operating in a single-point communication mode, and the activating the multi-point communication mode includes communicating with the sidelink UE via the base station on a Uu link.

Aspect 24: The method of any of Aspects 14-23, wherein the SRS includes fewer time-frequency resources than a synchronization signal block, a channel state information reference signal, or a demodulation reference signal.

Aspect 25: The method of any of Aspects 14-24, wherein the SRS is a synchronization signal block, a channel state information reference signal, or a demodulation reference signal.

Aspect 26: The method of any of Aspects 14-25, wherein one or more of an offset for the SRS, a bandwidth for the SRS, or a periodicity for the SRS is based at least in part on a configured grant configuration for the first device or a semi-persistent scheduling configuration.

Aspect 27: The method of any of Aspects 14-26, wherein the indication includes a single bit or includes one or more bits indicating a reference signal received power or other devices.

Aspect 28: The method of any of Aspects 14-27, wherein the indication is a sequence-based indication or a random access channel preamble.

Aspect 29: The method of any of Aspects 14-28, wherein the SRS is part of a resource set that corresponds to indications to a switch communication mode.

Aspect 30: The method of any of Aspects 14-29, further comprising transmitting an indication of a value for the threshold.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
one or more memories; and
one or more processors coupled to the one or more memories, the one or more memories comprising instructions executable by the one or more processors to cause the first device to:
receive, from a second device, a sounding reference signal (SRS) prior to a scheduled communication of the second device;
transmit, to the second device, an indication that a measurement of the SRS does not satisfy a threshold when the measurement of the SRS not satisfying the threshold;
activate, based at least in part on the transmitting the indication and before the scheduled communication, a multi-point communication mode; and
receive, in the multi-point communication mode, the scheduled communication from a third device.

2. The first device of claim 1, wherein the first device is a user equipment (UE) operating in a single-point communication mode, the second device is a transmit receive point (TRP), and wherein the one or more memories further comprises instructions executable by the one or more processors to cause the first device to switch to a multi-TRP communication mode.

3. The first device of claim 1, wherein the first device is a transmit receive point (TRP), the second device is a user equipment (UE) operating in a single-point communication mode, and the indication causes the UE to switch to a multi-TRP communication mode.

4. The first device of claim 3, wherein the one or more memories further comprises instructions executable by the one or more processors to cause the first device to transmit, to the UE, a message that configures the UE to transmit the SRS before the scheduled communication.

5. The first device of claim 1, wherein the first device is operating in a single-point communication mode, the second device is a sidelink UE or a network entity, and wherein the one or more memories further comprises instructions executable by the one or more processors to cause the first device to communicate with the sidelink UE via the network entity on a Uu link.

6. The first device of claim 1, wherein the first device is a sidelink UE or a network entity, the second device is operating in a single-point communication mode, and the indication causes the second device to communicate with the sidelink UE via the network entity on a Uu link.

7. The first device of claim 1, wherein the SRS includes fewer time-frequency resources than a synchronization signal block, a channel state information reference signal, or a demodulation reference signal.

8. The first device of claim 1, wherein the SRS is a synchronization signal block, a channel state information reference signal, or a demodulation reference signal.

9. The first device of claim 1, wherein one or more of an offset for the SRS, a bandwidth for the SRS, or a periodicity for the SRS is based at least in part on a configured grant configuration for the first device or a semi-persistent scheduling configuration.

10. The first device of claim 1, wherein the indication includes a single bit or includes one or more bits indicating a reference signal received power or other devices.

11. The first device of claim 1, wherein the indication is a sequence-based indication or a random access channel preamble.

12. The first device of claim 1, wherein the SRS is part of a resource set that corresponds to indications to switch a communication mode.

13. The first device of claim 1, wherein the memory one or more memories further comprises instructions executable by the one or more processors to cause the first device to receive an indication of a value for the threshold.

14. A second device for wireless communication, comprising:
one or more memories; and
one or more processors coupled to the one or more memories, the one or more memories comprising instructions executable by the one or more processors to cause the second device to:
transmit, to a first device, a sounding reference signal (SRS) prior to a scheduled communication of the second device;
receive, from the first device, an indication that a measurement of the SRS does not satisfy a threshold;
activate, based at least in part on the indication and before the scheduled communication, a multi-point communication mode; and
transmit, in the multi-point communication mode, the scheduled communication to a third device.

15. The second device of claim 14, wherein the first device is a user equipment (UE) operating in a single-point communication mode, and the second device is a transmit receive point (TRP).

16. The second device of claim 15, wherein the one or more memories further comprises instructions executable by the one or more processors to cause the second device to transmit a message that causes the UE to switch to a multi-TRP communication mode.

17. The second device of claim 14, wherein the first device is a transmit receive point (TRP), the second device is a user equipment (UE) operating in a single-point communication mode, and wherein the one or more memories further comprises instructions executable by the one or more processors to cause the second device to switch to a multi-TRP communication mode.

18. The second device of claim 17, wherein the one or more memories further comprises instructions executable by the one or more processors to cause the second device to receive a message that configures the second device to transmit the SRS before the scheduled communication.

19. The second device of claim 14, wherein the first device is operating in a single-point communication mode, and the second device is a programmable logic controller (PLC) or a network entity.

20. The second device of claim 19, wherein the one or more memories further comprises instructions executable by the one or more processors to cause the second device to transmit a message that causes the first device to communicate with the PLC via the network entity on a Uu link.

21. The second device of claim 14, wherein the first device is a sidelink UE or a network entity, the second device is operating in a single-point communication mode, and wherein the one or more memories further comprises instructions executable by the one or more processors to cause the second device to communicate with the sidelink UE via the network entity on a Uu link.

22. The second device of claim 14, wherein the SRS includes fewer time-frequency resources than a synchronization signal block, a channel state information reference signal, or a demodulation reference signal.

23. The second device of claim 14, wherein the SRS is a synchronization signal block, a channel state information reference signal, or a demodulation reference signal.

24. The second device of claim 14, wherein one or more of an offset for the SRS, a bandwidth for the SRS, or a periodicity for the SRS is based at least in part on a configured grant configuration for the first device or a semi-persistent scheduling configuration.

25. The second device of claim 14, wherein the indication includes a single bit or includes one or more bits indicating a reference signal received power or other devices.

26. The second device of claim 14, wherein the indication is a sequence-based indication or a random access channel preamble.

27. The second device of claim 14, wherein the SRS is part of a resource set that corresponds to indications to a switch communication mode.

28. The second device of claim 14, wherein the one or more memories further comprises instructions executable by the one or more processors to cause the second device to transmit an indication of a value for the threshold.

29. A method of wireless communication performed by a first device, comprising:
receiving, from a second device, a sounding reference signal (SRS) prior to a scheduled communication of the first device;
transmitting, to the second device, an indication that a measurement of the SRS does not satisfy a threshold when the measurement of the SRS does not satisfy the threshold;
activating, based at least in part on the transmitting the indication and before the scheduled communication, a multi-point communication mode; and
receiving, in the multi-point communication mode, the scheduled communication from a third device.

30. A method of wireless communication performed by a second device, comprising:
transmitting, to a first device, a sounding reference signal (SRS) prior to a scheduled communication of the second device;
receiving, from the first device, an indication that a measurement of the SRS does not satisfy a threshold;
activating, based at least in part on the indication and before the scheduled communication, a multi-point communication mode; and
transmitting, in the multi-point communication mode, the scheduled communication to a third device.

* * * * *